(12) United States Patent
Kriech et al.

(10) Patent No.: US 6,770,127 B2
(45) Date of Patent: Aug. 3, 2004

(54) MULTIGRADE ASPHALT POWER ADDITIVE

(75) Inventors: Anthony J. Kriech, Indianapolis, IN (US); Herbert L. Wissel, Indianapolis, IN (US); Haifang Zhou, Jinan (CN); Xuefeng Liu, Jinan (CN); Feng Xu, Jinan (CN)

(73) Assignee: Shandong Heritage Highway Materials Technologies, Shandong (CN)

( * ) Notice: Subject to any disclaimer, the term of this patent is extended or adjusted under 35 U.S.C. 154(b) by 73 days.

(21) Appl. No.: 10/147,206

(22) Filed: May 16, 2002

(65) Prior Publication Data

US 2003/0213407 A1 Nov. 20, 2003

(51) Int. Cl.[7] .................. C08L 91/00; C08L 93/00; C08L 95/00
(52) U.S. Cl. ............... 106/219; 106/316; 106/273.1
(58) Field of Search ................. 106/219, 316, 106/273.1

(56) References Cited

U.S. PATENT DOCUMENTS

| | | | | |
|---|---|---|---|---|
| 3,556,827 A | * | 1/1971 | McConnaughahy | 106/279 |
| 3,607,773 A | | 9/1971 | Pitchford et al. | |
| 3,904,428 A | * | 9/1975 | McConnaughay | 106/278 |
| 3,980,598 A | | 9/1976 | Moorwessel et al. | 524/69 |
| 4,362,568 A | | 12/1982 | Ostermeyer | 106/277 |
| 4,676,927 A | * | 6/1987 | Schilling et al. | 516/47 |
| 4,859,245 A | | 8/1989 | Schilling et al. | 106/277 |
| 4,874,432 A | | 10/1989 | Kriech et al. | |
| 4,933,384 A | | 6/1990 | Wolfe | 524/69 |
| 4,975,476 A | | 12/1990 | Wolfe | 524/59 |
| 5,221,703 A | | 6/1993 | Ostermeyer | 524/68 |
| 5,320,671 A | * | 6/1994 | Schilling | 106/277 |
| 5,437,717 A | | 8/1995 | Doyle et al. | 106/220 |
| 5,473,000 A | | 12/1995 | Pinomaa | 524/59 |
| 5,476,542 A | | 12/1995 | Doyle et al. | 106/219 |
| 5,496,400 A | * | 3/1996 | Doyle et al. | 106/220 |
| 5,596,032 A | * | 1/1997 | Schilling et al. | 524/60 |
| 5,670,562 A | | 9/1997 | Schilling | 106/277 |
| 5,713,996 A | | 2/1998 | Morris et al. | 106/277 |
| 5,749,953 A | | 5/1998 | Doyle | 106/273.1 |
| 5,776,234 A | * | 7/1998 | Schilling | 516/47 |
| 5,880,241 A | | 3/1999 | Brookhart et al. | 526/348 |
| 6,218,493 B1 | | 4/2001 | Johnson et al. | 526/351 |
| 6,309,456 B1 | | 10/2001 | Anthony | 106/277 |
| 6,310,163 B1 | | 10/2001 | Brookhart et al. | 526/318.6 |

FOREIGN PATENT DOCUMENTS

CN  1194281  9/1998

OTHER PUBLICATIONS

Copy of International Search Report for International Application No. PCT/IB03/02492 completed on Nov. 13, 2003.

* cited by examiner

*Primary Examiner*—Helene Klemanski
(74) *Attorney, Agent, or Firm*—Baker & Daniels

(57) ABSTRACT

An additive composition than can be incorporated into asphalt materials to impart thereto multigrade characteristics. The additive is prepared by reacting together at least one saponifiable organic acid, at least one resin acid, at least one unsaturated organic compound, and an alkali metal base to form a reaction product. Water produced during the reaction is removed as the reaction proceeds. The resulting reaction product can be formed into a powder and combined together with asphalt materials to produce multigrade asphalts.

30 Claims, 1 Drawing Sheet

MULTIGRADE ASPHALT POWER ADDITIVE

TECHNICAL FIELD

The present invention relates to asphalt cement compositions for use in paving and roofing products and more particularly to powder additive compositions that can be added to asphalt cements to impart multigrade properties thereto.

BACKGROUND ART

Asphalt compositions are used in over 90 percent of the pavement surface applications in the United States. Natural asphalts obtained from lakebeds were utilized as early as 1874. Years later, rock asphalt deposits found in several southern and western states were pulverized, placed and rolled to form pavement surfaces. Since the early 1900's, asphalts produced during the process of refining petroleum have dominated both paving and roofing applications.

Asphalt is a dark brown to black, highly viscous material containing bitumens as the principle constituent and is found in varying proportions in most crude petroleums. The asphaltic residuum from petroleum refining, substantially freed of lighter overhead fractions, is commonly called "asphalt." Paving asphalts are classified as asphalt cement, cutback asphalt and asphalt emulsions.

Asphalt cement is an asphalt having properties that are particularly suitable for pavement surface and roofing applications and specialty products. For road construction, asphalt is heated to a free flowing consistency and mixed with an aggregate heated to approximately the same temperature (usually 135° C. to 160° C.). The resulting mixture is placed on a prepared surface, compacted and cured to produce hot mix asphalt (HMA). In the long history of asphalt paving, the hot mix process of mixing asphalt cement and aggregate has remained the process of choice as offering the most favorable balance of cost and quality.

Asphalt cements used in paving applications today are graded according to stiffness at different temperatures before and after aging. The most common grading system in the United States is based on specifications from the Association of American Highway and Transportation Officials (AASHTO).

Superpave (superior performing pavements) refers to pavements that are made by a method of construction developed in the United States through research funded by AASHTO. Grading is based on high and low temperature stiffness of the asphalt binder under Superpave performance graded (PG) binder specification. A PG graded binder PG 64-22 would have a stiffness modulus of at least 1 Kilo Pascal (kPa) at 64° C. This asphalt after short term and long term aging would also have a limiting stiffness of less than 300,000 kPa at −22° C. over a 2 hour time period. The low temperature stiffness gives equivalent values at −12° C. (10° C. warmer) over 2 minutes and is the method used by AASHTO. Adding the two temperatures together for a given PG grade gives the temperature range over which the asphalt performs. For PG 64-22 the temperature spread would be 86° C. This temperature spread is typical of a high quality unmodified paving asphalt cement. The PG grading system from AASHTO increases and decreases in grade in 6° C. increments. To produce a PG 70-22 grade which would be the next high temperature grade in the specification without reducing the low temperature to −16° C. is difficult with unmodified asphalt. Only a few asphalts can achieve the 92° C. spread without modification. In order to increase spread most asphalt cement manufacturers have resorted to adding modifiers. Modification can be done by a number of methods including addition of polymers or chemicals.

Outside of the United States asphalts are generally graded by other methods such as penetration or viscosity. Penetration involves dropping a needle with 100 grams of mass into the asphalt cement at 25° C. A soft asphalt will allow the needle to penetrate more deeply into the asphalt cement. Asphalts used in colder climates use softer grades and in warmer climates harder asphalts are used to avoid rutting of the pavement. Another grading system that is used is grading by viscosity. Asphalts cements are graded at 60° C. using viscosity and at 25° C. using penetration to characterize the asphalt at two temperatures. Roofing asphalts used in Build Up Roofs (BUR's) for flat or sloped roofs are graded by penetration and softening point under the ASTM Method D312 international specification. Softening point is the temperature at which the asphalt first begins to soften and is an indication of flow temperature in roofs and some paving specifications. Generally asphalts with softer penetration and higher softening points would be considered as having a broader temperature range analogous to PG grades with broader temperature ranges of 92° C. or greater, and again would contain modifiers to improve the temperature range for the asphalt to perform within.

Asphalt cements for paving applications must be selected with care based on the traffic loading, speed, and climate to which the pavement will be exposed. High traffic loading, low traffic speed and wide climate ranges require asphalts that have broad temperature requirements. The asphalt must have sufficient stiffness to resist flowing during excessive hot weather with slow moving trucks. It also must not crack on the coldest days of the year especially after many years of service. Pavements in more moderate climates with little traffic require much less of a temperature range and unmodified asphalts have shown historic performance in such applications.

In roofing asphalt, the roof location (climate) and slope of the roof are important considerations. Again, the asphalt must not soften too much on the hottest day of the year and cause the roof to slide or flow due to the slope of the roof. Minimum softening points have been found to be a good measure to assure against this happening. This is analogous to high temperature stiffness measurements in paving asphalts.

To avoid low temperature cracking in penetration graded asphalt cements, the material is evaluated for penetration at 25° C. and 4° C. with minimum values to insure that the asphalt does not reach its limiting stiffness of 300,000 kPa used in performance graded paving asphalt testing.

U.S. Pat. No. 4,874,432, assigned to Asphalt Materials, Inc. was developed to produce a "multigrade" or gelled asphalt cement having improved properties over conventional asphalt cements, including reduced temperature susceptibility and a lower age hardening rate. These improved properties were achieved using conventional hot-mix asphalt processes in existing hot-mix equipment, standard roofing application equipment and specialty asphalt application equipment.

The term multigrade asphalt was adopted by the assignee of U.S. Pat. No. 4,874,432 to describe a novel gelled asphalt cement having reduced temperature susceptibility and improved age hardening properties as compared to conventional asphalt cement. These improvements were accomplished by saponifying in the liquid asphalt, substantially free of water, at least one saponifiable organic acid and at least one resin acid with an alkali metal base, or by adding the already saponified product to the liquefied asphalt. The resulting gelled asphalt can be utilized in conventional processes in road, roofing and specialty applications.

Conventional asphalt cements have the Theological properties of viscous liquids when used at elevated temperatures in hot-mix processes. The asphalt remains a flowable liquid in accordance with its particular viscosity-temperature relationship, throughout its incorporation with aggregate and its laydown as an asphaltic concrete. In this physical state the asphalt is susceptible to flowing off the aggregate, depending on factors such as temperature, nature and surface area of the aggregate and the size and configuration of voids.

The inventors of U.S. Pat. No. 4,874,432 discovered that asphalt could be gelled by a direct saponification reaction requiring only a trace amount of an ionizing liquid to form an ionizing zone within the liquified asphalt where the saponification reaction can begin. Water produced as the reaction proceeds is sufficient to sustain a reaction that permeates the entire mix containing the asphalt and saponification ingredients.

Because of the qualitative advantages of gelled multigrade asphalt prepared according to U.S. Pat. No. 4,874,432, a paving asphalt grading as a PG 64-22 under Superpave can be upgraded to a PG 70-22. This allows a one grade improvement in high temperature properties without a loss of low temperature characteristics. In effect, asphalt cements manufactured in this manner impart a greater temperature range to the asphalt cement from an 86° C. temperature spread to a 92° C. spread. Similarly, this process improves the grading range using penetration viscosity and softening point range for paving and roofing asphalts.

Multigrade asphalt cement made by the process as described in U.S. Pat. No. 4,874,432 is a substantially water free material that is capable of being stored at a temperature of 120° C. or higher without foaming and is suitable for shipping to end users for mixing with aggregate to produce asphaltic concrete by conventional hot-mix methods. It is also suitable for shipping to end users for conventional roofing and specialty applications.

The manufacture of multigrade asphalt cement is performed at regional facilities using processes such as described in U.S. Pat. No. 4,874,432. This multigrade asphalt cement is then transferred to HMA manufacturing facilities at other locations for the mixing with appropriate heated aggregates. The costs associated with the transport of the asphalt cement results in a geographical limitation on the ability to market multigrade asphaltic cement over a wide area due to shipping costs. In addition, the capital costs for the construction of multigrade asphalt cement manufacturing facilities limits the ability to fully utilize this high quality product at many locations around the world.

Heretofore multigrade asphalts have been produced by adding unreacted reactant components to liquid asphalt compositions, and allowing the reactant components to react together within the liquid asphalt composition media. The reaction products of the added reactant components produced in the liquid asphalt media interact with the components of the liquid asphalt composition and effect changes in the high and/or low temperature characteristics of the resulting liquid asphalts. One limitation on such a process is that the necessary liquid asphalt component which serves as the medium in which the added reactant components react, has a significant mass or bulk volume that creates handling difficulties and requires rather large processing equipment.

The present invention is directed to a composition that is the reaction product of certain reactant components that is produced by reacting the reactant components together outside of any asphalt media. The resulting reaction composition (referred to below as a multigrade additive) can subsequently be added to conventional asphalt cement compositions to produce multigrade asphalt cement products as described herebelow.

DISCLOSURE OF THE INVENTION

According to various features, characteristics and embodiments of the present invention which will become apparent as the description thereof proceeds, the present invention provides a multigrade powder additive composition which consists essentially of the reaction product of:

a) at least one saponifiable organic acid;

b) at least one resin acid;

c) at least one unsaturated organic compound; and d) an alkali metal base, wherein water is removed during the reaction so that the percentage of water in the final reaction product is from about 0.2 to about 1.5 wt. %.

The present invention further provides a method of making a multigrade powder additive composition which involves:

a) providing at least one saponifiable organic acid;

b) providing at least one resin acid;

c) providing at least one unsaturated organic compound; and d) providing an alkali metal base, e) combining the least one saponifiable organic acid, the at least one resin acid, the at least one unsaturated organic compounds, and the alkali metal base together to form a reaction mixture that undergoes a saponifying reaction;

f) removing water from the reaction mixture during the saponifying reaction; and g) recovering the reaction product.

The present invention also provides a multigrade asphalt which includes:

a) a preformed reaction product of:

i) at least one saponifiable organic acid;

ii) at least one resin acid;

iii) at least one unsaturated organic compound; and iv) an alkali metal base combined together with b) an asphalt material.

The present invention further provides a method of making a multigrade asphalt which involves:

a) combining and reacting together:

i) at least one saponifiable organic acid;

ii) at least one resin acid;

iii) at least one unsaturated organic compound; and iv) an alkali metal base; to form a reaction product; and b) combining the reaction product with an asphalt material.

BRIEF DESCRIPTION OF DRAWINGS

The present invention will be described with reference to the attached drawings which are given as non-limiting examples only, in which.

BEST MODE FOR CARRYING OUT THE INVENTION

Figure 1:
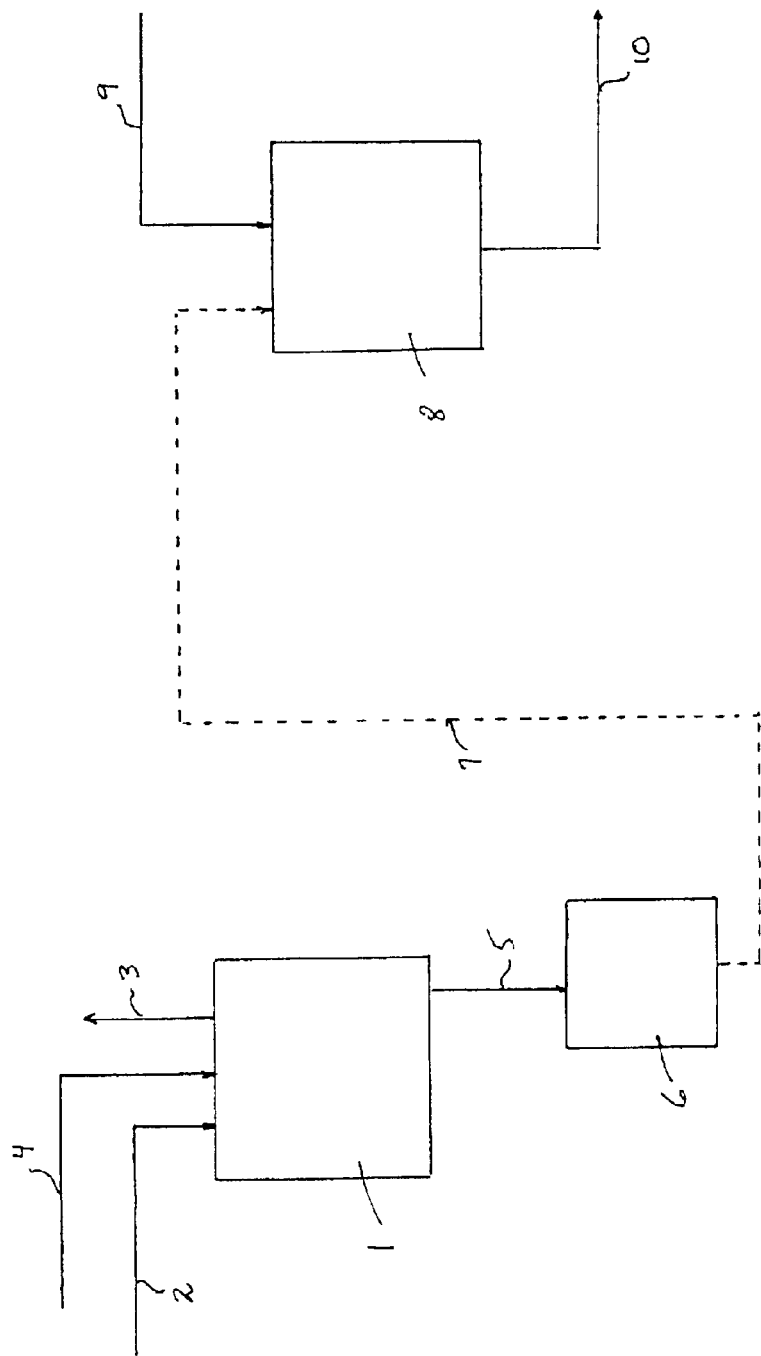
FIG. 1 is a process diagram which depicts one manner in which the MAC Powder of the present invention can be produced and used.

The present invention is directed to asphalt cement compositions for use in paving and roofing products and more particularly to powder additive compositions that can be added later to asphalt cements to impart multigrade properties thereto.

The invention involves the formulation of a Multigrade Asphalt Cement powder (referred to herein as "MAC Powder") which can be added to conventional asphalt cement compositions to produce multigrade (or gelled) asphalt cement products. The MAC Powder of the present invention has a unique composition and can be manufactured at a central site for shipment, in the powder form, to end users for subsequent incorporation into asphalt cement products.

MAC Powder is produced by saponifying at least one saponifiable organic acid, at least one resin acid and at least one unsaturated organic compound (such as an olefin) with an alkali metal base. The resulting saponified material can be produced with a desired moisture content and subsequently formed into a powder by grinding, milling, etc. at a central production facility for shipment as an additive powder to asphalt processing facilities that make asphalt cement products. The resulting multigrade asphalt cement products produced at the asphalt processing facilities may be prepared and applied using conventional hot-mix equipment, standard roofing application equipment and other conventional application equipment, or prepared using heated tanks equipped with high-speed mixers.

The saponifiable organic acid and the resin acid components can be conveniently added in the form of tall oil. Tall oil is the liquid resinous material obtained in the digestion of wood pulp from paper manufacture. Commercial tall oil generally comprises a complex of fatty acids, principally acids having 18 carbon atoms, resin acids and unsaponifiables, including sterols, higher alcohols, waxes and hydrocarbons. Tall oil varies in the proportion of these constituents depending on a number of factors, including the geographic location of the trees furnishing the wood pulp. Preferably, unsaponifiable matter in the tall oil should be less than about 30 percent (ASTM D803). The ratio of fatty acid to resin acid should be between about 0.7 and about 2.0, preferably about 1:1. Either crude or refined tall oils can be used. Otherwise, individual fatty acids from non-tall oil sources can be blended with resin acids and used in proportions that approximate the acid components of crude tall oil.

Saponifiable organic acids (including esters thereof) that can be used for purposes of the present invention include one or more saturated or unsaturated branched or straight chain fatty acids containing from about 12 to about 24 carbon atoms. Examples of saponifiable organic acids include stearic acid, oleic acid, linoleic acid, linolenic acid, organic sulfonic acids and mixtures thereof.

Resin acids that can be used for purposes of the present invention include abietic acid, neo-abietic acid, dihydroxyabietic acid, palustric acid or isodextropimaric acid or mixtures thereof.

Unsaturated organic compounds that can be used for purposes of the present invention include sterols and olefins in general. An unsaturated organic compound found to be particularly useful for purposes of the present invention is EE-2, a functionally modified olefin available from Eastman Chemical Company, Kingsport, Tenn.

The alkali metal base can be an alkali metal, alkali metal oxide, alkali metal hydroxide or alkali metal salt, such as metallic sodium, sodium oxide, sodium carbonate or sodium hydroxide, or the corresponding potassium or lithium compounds. Preferably, the base should be substantially dry and in finely-divided particulate form when added.

Multigrade asphaltic cements can be manufactured in a more efficient and cost effective manners by using the MAC Powder of the present invention. In this regard, the MAC Powder can be incorporated into asphalt cement compositions using low cost mixers at asphalt concrete facilities, making the shipping costs of MAC Powder insignificant as compared to the costs to transport gross amounts of asphalt cements. In addition, the high effectiveness of MAC Powder allows for lower additive rates of the MAC Powder (generally 20% less) as compared to conventional multigrade asphalt cement processing methods. The manufacturing process for producing MAC Powder can be optimized to produce a low moisture material that can be added directly to asphalt cements at customer facilities with a low or negligible impact on standard operation procedures.

MAC Powder can be used, i.e. added to asphalt cements, in low concentrations that are typically about 1.6 wt. % to about 4 wt. % to impart multigrade properties to the resulting asphalt cements. The use of MAC Powder at such low concentrations allows it to be shipped over large geographical areas economically, thus increasing the market for and use of multigrade asphalt cement products. MAC Powder can be stored and transported as a dry material, thus eliminating the need for special hot storage tanks and trucks. In addition, MAC Powder can be added to asphalt cements in relatively simple equipment, rather than the more expensive systems presently used for preparing multigrade asphalt cements. This allows smaller asphalt cement terminals and HMA facilities to be able to use MAC Powder and thereby upgrade their systems and operations to make multigrade asphaltic cement and HMA products. This also applies to manufacturers of asphalt cement based roofing and specialty applications.

MAC Powder can be produced at a central manufacturing facility, thus taking advantage of the economics of larger manufacturing equipment. The manufacture of MAC Powder at a central facility will also provide the ability to better control the quality of the production process, thus providing a more uniform product. As noted above, MAC Powder is produced by saponifying at least one fatty acid, at least one resin acid and at least one unsaturated organic compound (such as an olefin) with an alkali metal base. This material is heated and mixed until the desired moisture content is achieved. At that point it can be sized and packaged for shipment to users for the production of multigrade asphalt cement, asphalt roofing products or asphalt specialty products. At each user's site, the MAC Powder product can be incorporated into asphalt compositions by simple mixing in a heated tank equipped with a high speed mixer.

It is envisioned that a central facility would be used to manufacture MAC Powder for shipment to a wide geographical area. While smaller manufacturing operations could be used, the economics and potential for the production of uniform products of a larger production facility are usually significant. The central facility would use a mixing system to blend at least one fatty acid, at least one resin acid and at least one unsaturated organic compound (such as an olefin) with an alkali metal base. The mixing of the components together results in a saponifying reaction that is exothermic. The reaction also produces water as a byproduct that must be removed from the mixture to produce the desired end product. Water is removed by controlling the temperature of the reaction so that the water is driven off by temperature. Removing too little of the water during the process results in a product that is difficult to handle. In addition, the water is also a detrimental factor when the product is added to hot asphalt by the customer, because it causes foaming and other operational problems. If all of the water is removed from the MAC Powder, the powder loses effectiveness when used in the production of multigrade asphaltic cements. The addition of water prior to mixing the MAC Powder with asphalt cements can renew the MAC Powder's effectiveness, if the water is used in a proper ratio (typically 0.2 to 2.0% moisture).

FIG. 1 is a process diagram which depicts one manner in which the MAC Powder of the present invention can be produced and used. In FIG. 1, the reactants used to produce the MAC Powder are combined in a stirred tank 1. These reactants which include at least one saponifiable organic acid, at least one resin acid, at least one unsaturated organic compound, and an alkali metal base are fed into tank 1 as depicted by feed arrow 2. The tank and the reactants can be heated by conventional means. As discussed herein, the reaction produces water which is removed by controlling the temperature of the reaction and the addition of heat (if necessary). The water is depicted by arrow 3 as being removed. If the water causes foaming, an antifoaming agent can be added to the tank as indicated by arrow 4. As the reaction proceeds, the reaction mixture gradually changes from a liquid state to a black paste and eventually to a solid chunky and yellowish material when dried. This dried product is removed from the tank as depicted by arrow 5 and fed to a grinding machine 6 and ground until a major portion of the final product passes through a 3 mm sieve. The resulting MAC Powder is ready to be mixed with an asphalt material. Accordingly, FIG. 1 depicts a second mixing tank 8 in which the MAC Powder is combined with an asphalt material that has been heat to a liquid state. In FIG. 1 the feed of the asphalt material into the second mixing tank is depicted by arrow 9 and the resulting multigrade asphalt product is depicted by arrow 10. In FIG. 1 a dashed line 7 connects between grinding machine 6 and the second mixing tank 8. Dashed line 7 represents either transfer of the MAC Powder from the grinding machine 6 to the second mixing tank 8 within a common facility or site or the shipping of the MAC Powder from a facility at which is it produced to an off-site location whereat the MAC Powder is combined with an asphalt material in second mixing tank 8. It is to be understood from the Examples below, that the MAC Powder could be shipped to more that one off-site facility and that the MAC Powder could be moist or substantially dry and be in other than a powdered form when transferred or shipped.

The following Examples exemplify various features and characteristics of the present invention which is not to be considered as limited thereto. Throughout the Examples and elsewhere, percentages are by weight unless otherwise indicated.

EXAMPLE 1

In this example, 35 kg tall oil was heated to about 120±1° C. Next, EE-2 polymer (available from Eastman Chemical Company, Kingsport, Tenn.) was mixed into the heated tall oil from Nanping (Batch G in Table 1). The tall oil/EE-2 mixture was placed into a heated kneading Sigma mixing machine and liquid sodium hydroxide (NaOH; 50% by weight) was added during kneading. The ratio of tall oil/EE-2/liquid NaOH was 1:0.1:0.27. As the NaOH was added an exothermic chemical reaction takes place which raises the temperature to about 106±1° C. and causes bubbling and foaming to occur. Foaming is controlled by adding about 50 g of a defoaming agent such as Foam Blast 7 (Ross Chemicals, Fountain Inn, S.C.) to the mixture. During kneading, the mixture gradually changes from a liquid state to a black paste and eventually to a solid chunky and yellowish material. When the mixture becomes dry, heating is discontinued and kneading is continued until the temperature of the mixture reaches about 120±1° C. This kneading process takes about 4 hours to complete and produces about 38 kg of MAC Powder.

The dry product was broken into pieces and stored in an air tight container for 24 hours. After storage, the product was charged into a grinding machine and ground until a major portion of the final product passed through a 3 mm sieve. Generally, the product was a yellow-brownish powder of which about 79% passed through a 3 mm sieve. The water or moisture content was about 1.1±0.1 wt. %

2.5 wt. % of the MAC Powder was incorporated into a Qilu 70 Penetration Asphalt cement composition and mixed at 185° C. for 30 minutes and the resulting multigrade asphalt cement was found to have a softening point of approximately 98° C.

Table 1 lists data for a number of product batches which were made by the process described in this Example.

TABLE 1

| Batch No | Source of Tall Oil | Kneading rpm | wt % of MAC powder < 3 mm | Water Content | Powder Dosage Added to Asphalt Cement | Softening Point of Asphalt Cement |
|---|---|---|---|---|---|---|
| A | Shaoguan | 2920 | 90% | 0.54% | 3% | 60° C. |
| B | Shaoguan | 2920 | 90% | 0.54% | 4% | 85° C. |
| C | Shaoguan | 2920 | 90% | 0.32% | 4% | 80° C. |
| D | Shaoguan | 2920 | 90% | 0.74% | 3% | 90° C. |
| E | Fujian-Jilin | 1460 | 36% | 1.33 | 2.5% | 77° C. |
| F | Yezhou | 2438 | 79.1% | 1.30% | 2.5% | 95° C. |
| G | Nanping | 2438 | 79.1% | 0.99% | 2.5% | 98° C. |
| H | Nanping | 2438 | 79.1% | 1.21% | 2.5% | 92° C. |
| I | Nanping | 2438 | 79.1% | 1.12% | 2.5% | 96° C. |
| Control Qilu 70 Pen. | | | | | 0% | 50° C. |

The results in Table 1 were obtained using an NH-100 kneading machine and incorporating the MAC Powder into a Qilu 70 Penetration Asphalt Cement.

The results from Table 1 show that the particle size of the MAC powder, the moisture content of the of the MAC powder and the tall oil source are all factors which effect the improved softening point of the resulting modified asphalt cement. When the powder is too dry as in Batch C (0.32%), there is less improvement in softening point, compared to a moisture content of 0.54% in Batch B. Also, as moisture content moves from 0.54% in Batch B to 0.74% in Batch D, the softening point improves even though the amount of MAC powder decreases from 4% to 3.0%.

The results in Table 1 also show that all the tall oils tested improved the softening point of the resulting asphalt cement, substantially above the control asphalt, improving high temperature characteristics of the resulting modified asphalt cement after addition of the MAC powder.

EXAMPLE 2

According to one embodiment, a central manufacturing facility would be used to manufacture MAC Powder for sale and distribution to HMA production facilities. The MAC Powder would be produced by blending an appropriate feed stock of commercial tall oil (or other appropriate feed materials containing fatty acids and resin acids) with an olefin (or other appropriate unsaturated hydrocarbon material) and caustic (or other appropriate alkali metal base). The ratio of these materials by weight would be about 100 parts tall oil to about 10 parts olefin to about 27 parts liquid caustic (50%) for this example. The tall oil and olefin would be mixed together and preheated to about 120° C. prior to being charged into a heated mixer system. The liquid caustic component would be added at a slow rate to the mixer system in order to initiate the saponifying reaction. As the reaction proceeds, water and heat will be generated. The water will evaporate and the mixture will change from a liquid to a black paste, then to a solid yellow chunky material. The resulting produce will be dried to the desired endpoint (approximately 1% moisture) and stored for additional processing prior to packaging for shipment to customers.

The MAC Powder can be broken into smaller pieces and ground to a fine powder (80% passing through a 3 mm sieve). This material can be stored in sealed drums or bags for shipment to customers. At the customer site, the MAC Powder would be added in an amount of about 1.6 to 2.5 wt. % to a tank of asphalt cement equipped with a high-speed mixer at 185° C. to produce a high quality multigrade asphaltic cement.

EXAMPLE 3

In this Example, the same manufacturing process described above in Example 2 is followed with substantially complete removal of water from the MAC Powder material. The resulting dry MAC Powder would be packaged in sealed drums or bags for shipment to customers. Prior to the addition of this dry MAC Powder to a tank of asphalt cement equipped with a high-speed mixer, additional water would be added to ensure the complete reaction to take place in the asphalt cement mix tank. The amount of water added would be comparable to the amount needed to provide the MAC Powder with a moisture content of about 0.2 to about 2.0 wt. %. Table 2 lists data of modified asphalt cements made according to this Example.

TABLE 2

| Batch No. | Source of Tall Oil | Water Content of MAC powder | Power Dosage Added to Asphalt | Softening Point of Asphalt Cement |
| --- | --- | --- | --- | --- |
| J | Nanping | 0 | 2.5 | 52° C. |
| K | Nanping | 1.10 | 2.5 | 100° C. |

EXAMPLE 4

In this Example, the same manufacturing process as in Example 3 was used except that the MAC Powder produced was used in a BP Asphalt made from a Canadian Crude and graded as a PG 64-22 using the U.S. Performance Grading system. Table 3 lists the asphalt before addition of the MAC Powder for actual temperature spread as well as at the test levels of MAC Powder. The MAC Powder was added to the BP asphalt which was heated to 185° C. and mixed for 30 minutes.

TABLE 3

| Batch No. | Source of Tall Oil | Water Content of MAC powder | Power Dosage Added to Asphalt | PG Grade |
| --- | --- | --- | --- | --- |
| L | Nanping | — | 0 | PG 65-23 |
| M | Nanping | 1.10 | 2.5 | PG 71-23 |
| N | Nanping | 1.10 | 3.5 | PG 74-22 |

The results in Table 3 show that the unmodified asphalt graded under Superpave as a PG 64-22 with an actual temperature spread of PG 65-23 or 88° C. After the addition of 2.5% MAC Powder (Batch M) the spread increased to PG 71-23 or 94° C. which is an increase of 6° C. over the base asphalt. In Batch N the MAC Powder dose was increased to 3.5% by weight and the resulted in a PG grading of PG 75-22 or 97° C. which is an increase of 9° C. under the Superpave. This increases the performance characteristics of the asphalt over a much broader temperature range.

EXAMPLE 5

In this Example, the same manufacturing process described above in Example 2 is followed with less removal of water following the initial reactions. The resulting MAC Powder could be packaged and shipped to the customer, who would have to be prepared to take precautions if foaming occurs in the mix tank when the MAC Powder is added. In such a situation an antifoaming agent could be added to control foaming.

EXAMPLE 6

In this Example, the same manufacturing process described above in Example 4 is follows without any grinding of the reaction products. The MAC Powder material could be packaged for shipment to the customer. The customer would need to provide a more aggressive method for mixing the MAC Powder into the asphalt cement, such as a high-energy shear mixer rather than a high-speed mixer.

EXAMPLE 7

According to another embodiment of the present invention, using the same reactants and process, either smaller regional manufacturing facilities or site-specific facilities could be used to manufacture MAC Powder. The ability to manufacture MAC Powder in smaller batches depends on the capital equipment, raw material and operating costs associated with specific operations.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A multigrade additive composition for asphalts which consists essentially of the reaction product of:
    a) at least one saponifiable organic acid;
    b) at least one resin acid;
    c) at least one unsaturated organic compound; and
    d) an alkali metal base,
    wherein water is removed during the reaction so that the percentage of water in the final reaction product is from about 0.2 to about 1.5 wt. %.

2. A multigrade additive composition for asphalts according to claim 1, wherein the at least one saponifiable organic acid and the at least one resin acid are provided as components of tall oil.

3. A multigrade additive composition for asphalts according to claim 1, wherein the reaction product is in the form of a powder.

4. A multigrade additive composition for asphalts according to claim 1, wherein the at least one saponifiable organic acid comprises at least one of stearic acid, oleic acid, linoleic acid, linolenic acid, organic sulfonic acids and mixtures thereof.

5. A multigrade additive composition for asphalts according to claim 1, wherein the at least one resin acid comprises at least one of abietic acid, neo-abietic acid, dihydroxyabietic acid, palustric acid, isodextropimaric acid and mixtures thereof.

6. A multigrade additive composition for asphalts according to claim 1, wherein the at least one unsaturated organic compound comprises at least one olefin or similar compound or mixture thereof.

7. A multigrade additive composition for asphalts according to claim 1, wherein the alkali metal base comprises at least one of an alkali metal, an alkali metal oxide, an alkali metal hydroxide, an alkali metal salt, and mixtures thereof.

8. A multigrade additive composition for asphalts according to claim 7, wherein the alkali metal comprises at least one of sodium, potassium, and lithium compounds.

9. A method of making a multigrade additive composition for asphalts which comprises:
   a) providing at least one saponifiable organic acid;
   b) providing at least one resin acid;
   c) providing at least one unsaturated organic compound;
   d) providing an alkali metal base;
   e) combining the least one saponifiable organic acid, the at least one resin acid and the alkali metal base together to form a reaction mixture that undergoes a saponifying reaction;
   f) removing water from the reaction mixture during the saponifying reaction to produce a reaction product having a moisture content of between about 0.2 to about 1.5 wt. %; and
   g) recovering the reaction product.

10. A method of making a multigrade additive composition for asphalts according to claim 9, wherein the at least one saponifiable organic acid and the at least on resin acid are provided as tall oil.

11. A method of making a multigrade additive composition for asphalts according to claim 9, wherein the reaction product is formed into a powder.

12. A method of making a multigrade additive composition for asphalts according to claim 9, wherein the ratio of fatty acid to resin acid is between about 0.7 and about 2.

13. A method of making a multigrade additive composition for asphalts according to claim 9, wherein the at least one saponifiable organic acid comprises at least one of stearic acid, oleic acid, linoleic acid, linolenic acid, organic sulfonic acids and mixtures thereof.

14. A method of making a multigrade additive composition for asphalts according to claim 9, wherein the at least one resin acid comprises at least one of abietic acid, neo-abietic acid, dihydroxyabietic acid, palustric acid, isodextropimaric acid and mixtures thereof.

15. A method of making a mutigrade additive composition for asphalts according to claim 9 wherein the at least one unsaturated organic compound comprises at least one olefin or similar compound or mixture thereof.

16. A method of making a multigrade additive composition for asphalts according to claim 9, wherein the alkali metal base comprises at least one of an alkali metal, an alkali metal oxide, an alkali metal hydroxide, an alkali metal salt, and mixtures thereof.

17. A multigrade asphalt which comprises:
   a) a preformed reaction product consisting essentially of:
      i) at least one saponifiable organic acid;
      ii) at least one resin acid;
      iii) at least one unsaturated organic compound;
      iv) a water content of between about 0.2 to about 1.5 wt. %; and
      v) an alkali metal base; combined together with
   b) an asphalt material.

18. A multigrade asphalt according to claim 17, wherein water is removed during the reaction of the at least one saponifiable organic acid, the at least one resin acid, the at least one unsaturated organic compound, and the alkali metal base so that the percentage of water in the final reaction product is from about 0.2 to about 1.5 wt. %.

19. A multigrade asphalt according to claim 17, wherein the reaction product is dried before being combined with the asphalt material.

20. A multigrade asphalt according to claim 19, wherein the reaction product is formed into a powder before being combined with the asphalt material.

21. A multigrade asphalt according to claim 20, wherein the powder has a size in which at least 80% of the powder can pass through a 3 mm sieve.

22. A multigrade asphalt according to claim 17, comprising about 1.6 wt. % to about 4 wt. % of the preformed reaction product.

23. A method of making a multigrade asphalt which comprises:
   a) combining and reacting together:
      i) at least one saponifiable organic acid;
      ii) at least one resin acid;
      iii) at least one unsaturated organic compound; and
      iv) an alkali metal base to form a reaction product having a moisture content of between about 0.2 to about 1.5 wt. %; and
   b) combining the reaction product with an asphalt material.

24. A method of making a multigrade asphalt according to claim 23, water is removed during the reaction of the at least one saponifiable organic acid, the at least one resin acid and the alkali metal base so that the percentage of water in the final reaction product is from about 0.2 to about 1.5 wt. %.

25. A method of making a multigrade asphalt according to claim 23, wherein the reaction product is dried before being combined with the asphalt material.

26. A method of making a multigrade asphalt according to claim 23, wherein the reaction product is formed into a powder before being combined with the asphalt material.

27. A method of making a multigrade asphalt according to claim 26, wherein the powder has a size in which at least 80% of the powder can pass through a 3 mm sieve.

28. A method of making a multigrade asphalt according to claim 23, wherein about 1.6 wt. % to about 4 wt. % of the reaction product is added to about 96 wt. % to about 98 wt. % of the asphalt material.

29. A method of making a multigrade asphalt according to claim 23, wherein the reaction product is produced at first site and combined with the asphalt material at a second site.

30. A method of making a multigrade asphalt according to claim 29, wherein the reaction product is shipped from said first site to said second site.

* * * * *

UNITED STATES PATENT AND TRADEMARK OFFICE
CERTIFICATE OF CORRECTION

PATENT NO. : 6,770,127 B2 Page 1 of 1
DATED : August 3, 2004
INVENTOR(S) : Anthony J. Kriech et al.

It is certified that error appears in the above-identified patent and that said Letters Patent is hereby corrected as shown below:

<u>Title page, Item [54] and Column 1, line 1,</u>
Title, please delete "POWER" and insert in lieu thereof -- POWDER --.

Signed and Sealed this

Thirtieth Day of November, 2004

JON W. DUDAS
*Director of the United States Patent and Trademark Office*